US012231870B2

(12) United States Patent
Horbach

(10) Patent No.: US 12,231,870 B2
(45) Date of Patent: Feb. 18, 2025

(54) ENHANCED HEADPHONE DESIGN USING DSP AND ARRAY TECHNOLOGY

(71) Applicant: Harman International Industries, Incorporated, Stamford, CT (US)

(72) Inventor: Ulrich Horbach, Oberschneiding (DE)

(73) Assignee: Harman International Industries, Incorporated, Stamford, CT (US)

( * ) Notice: Subject to any disclaimer, the term of this patent is extended or adjusted under 35 U.S.C. 154(b) by 238 days.

(21) Appl. No.: 18/088,037

(22) Filed: Dec. 23, 2022

(65) Prior Publication Data

US 2023/0217206 A1 Jul. 6, 2023

(30) Foreign Application Priority Data

Jan. 4, 2022 (EP) .................................... 22150220

(51) Int. Cl.
*H04S 7/00* (2006.01)

(52) U.S. Cl.
CPC .......... *H04S 7/304* (2013.01); *H04S 2420/01* (2013.01)

(58) Field of Classification Search
CPC ........... H04R 1/10–1091; H04R 5/033; H04R 5/0335; H04R 2201/029–109; H04R 2205/022; H04R 2460/00–17; H04S 1/005; H04S 3/004; H04S 7/304; H04S 7/306
See application file for complete search history.

(56) References Cited

U.S. PATENT DOCUMENTS 9,392,354 B2 7/2016 Willberg
11,146,874 B2 10/2021 Bottoni et al.
2007/0223735 A1 9/2007 Lopresti et al.
(Continued)

FOREIGN PATENT DOCUMENTS

CN 106714021 5/2017
CN 106714021 A * 5/2017 .......... H04R 1/1041
(Continued)

OTHER PUBLICATIONS

English machine translation of CN 106714021 A (Wu et al.; Earphones and electronic assembly; published May 2017) (Year: 2017).*
(Continued)

*Primary Examiner* — Mark Fischer
(74) *Attorney, Agent, or Firm* — Burris Law, PLLC

(57) ABSTRACT

A headphone arrangement includes two earphones, wherein each earphone comprises a housing encompassing a low-frequency transducer and an array of at least three high-frequency transducers. The low-frequency transducer of each earphone is disposed on or over an ear canal of a user when the earphone is worn by the user, and is configured to broadcast low-frequency sound that corresponds to low-frequency components of an input signal. The array of at least three high frequency transducers of each array are configured to broadcast high-frequency sound that corresponds to high-frequency components of the input signal, and the array of at least three high frequency transducers of each array is disposed adjacent to the low-frequency transducer and in a lower rostral quadrant of a full circle around the low-frequency transducer when the earphone is worn by the user.

15 Claims, 12 Drawing Sheets

(56) References Cited

U.S. PATENT DOCUMENTS

| | | | | |
|---|---|---|---|---|
| 2013/0216074 A1* | 8/2013 | Kon | | H04R 5/02 381/310 |
| 2021/0058693 A1 | 2/2021 | Woelfl | | |

FOREIGN PATENT DOCUMENTS

| | | | | | |
|---|---|---|---|---|---|
| CN | 110099326 A | * | 8/2019 | | H04R 1/1041 |
| GB | 2486688 A | * | 6/2012 | | H04R 1/26 |
| KR | 1020050088575 | | 9/2005 | | |

OTHER PUBLICATIONS

Extended European Search Report issued in corresponding EP Application 22150220.6, issued Jun. 27, 2022, 11 pages.
Fleischmann, et al., Identification and Evaluation of Target Curves for Headphones, Audio Engineering Society Convention Paper 8740, Presented at the 133rd Convention, Oct. 26-29, 2012, San Francisco, CA USA.
G. Theile, Equalization of Studio Monitor Headphones, Audio Engineering Society Conference Paper, Presented at the Conference on Headphone Technology Aug. 24-26, 2016, Aalborg, Denmark.
Arnott, et al., Assessing the auditory dual-pathway model in humans, NeuroImage, vol. 22, Issue 1, 2004, pp. 401-408.
Denk, et al., Adapting Hearing Devices to the Individual Ear Acoustics: Database and Target Response Correction Functions for Various Device Styles, Trends in Hearing, 2018, Oldenburg, Germany.

* cited by examiner

ENHANCED HEADPHONE DESIGN USING DSP AND ARRAY TECHNOLOGY

CROSS-REFERENCE TO RELATED APPLICATIONS

This application claims priority to and the benefit of EP 22150220.6 filed on Jan. 4, 2022. The disclosure of the above application is incorporated herein by reference.

FIELD

The present disclosure relates to a headphone arrangement having two earphones.

BACKGROUND

The statements in this section merely provide background information related to the present disclosure and may not constitute prior art.

High quality stereo headphones (e.g., stereo headphones having two earphones) may reproduce sound sources without apparent coloration and deliver undistorted acoustic stereo images in accordance with the original recording. Moreover, headphones may project the acoustic images in front of the head of a user in an angular range comparable to a typical loudspeaker setup, such as a ±30°-45° deviation from the horizontal midline axis of the face of the user, as when produced by a recording engineer in a studio environment.

SUMMARY

This section provides a general summary of the disclosure and is not a comprehensive disclosure of its full scope or all of its features.

A headphone arrangement includes two earphones, wherein each earphone from among the two earphones comprises a housing encompassing a low-frequency transducer and an array of at least three high-frequency transducers. The low-frequency transducer of each earphone is disposed on or over an ear canal of a user when the earphone is worn by the user, and the low-frequency transducer of each earphone is configured to broadcast low-frequency sound that corresponds to low-frequency components of an input signal. The array of at least three high frequency transducers of each array are configured to broadcast high-frequency sound that corresponds to high-frequency components of the input signal, and the array of the at least three high frequency transducers of each array is disposed adjacent to the low-frequency transducer and in a lower rostral quadrant of a full circle around the low-frequency transducer when the earphone is worn by the user.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 20:
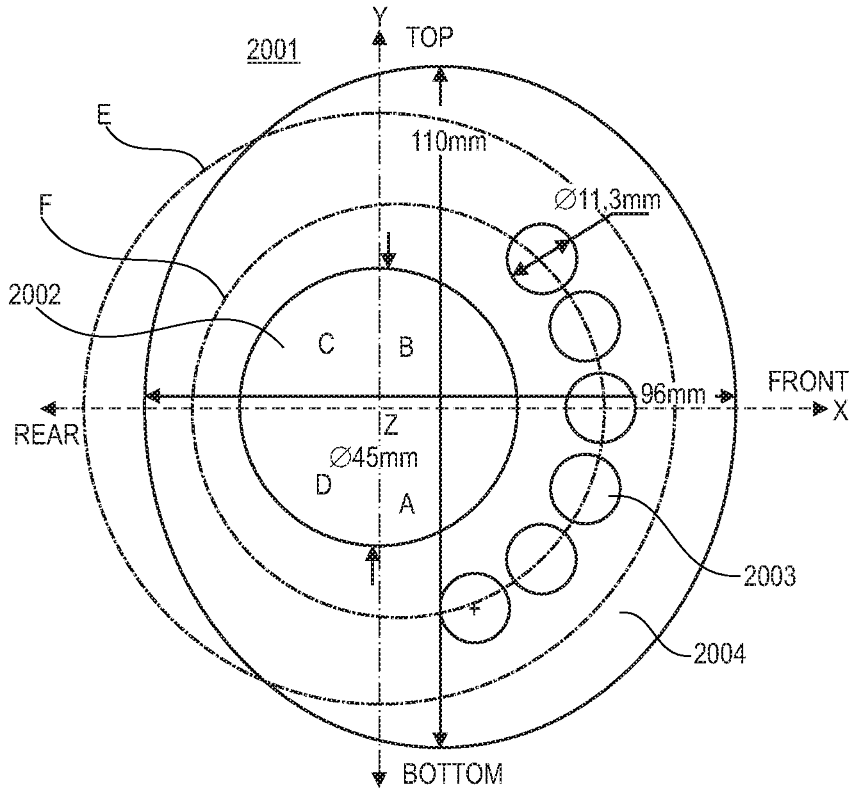
FIG. 20 is a schematic diagram illustrating a transducer arrangement of an example two-way headphone with a large low-frequency transducer and an array of small high-frequency transducers in accordance with the teachings of the present disclosure.
Figure 21:
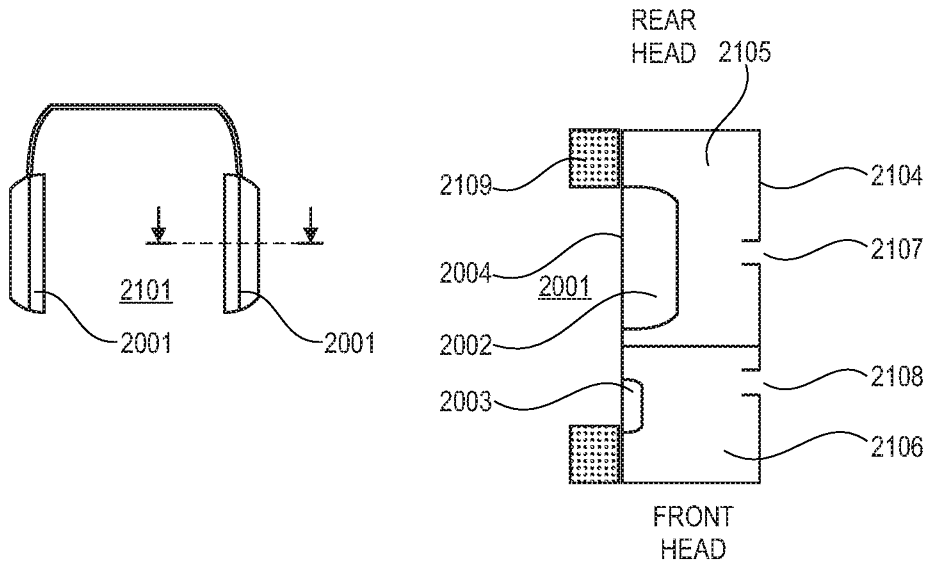
FIG. 21 is a cross-sectional top view of the two-way headphone shown partly in FIG. 20 in accordance with the teachings of the present disclosure.
Figure 23:
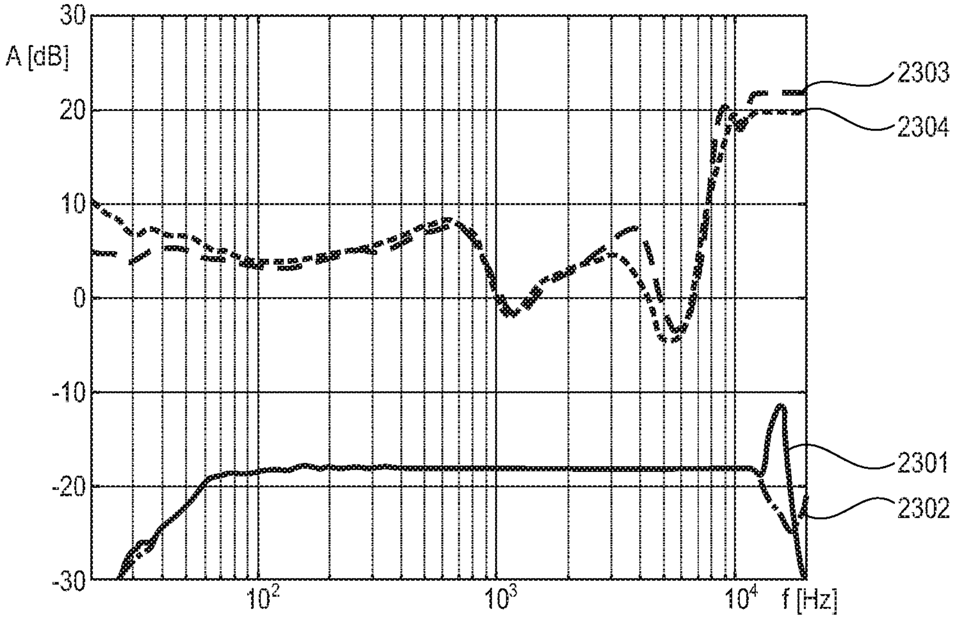
Figure 24:
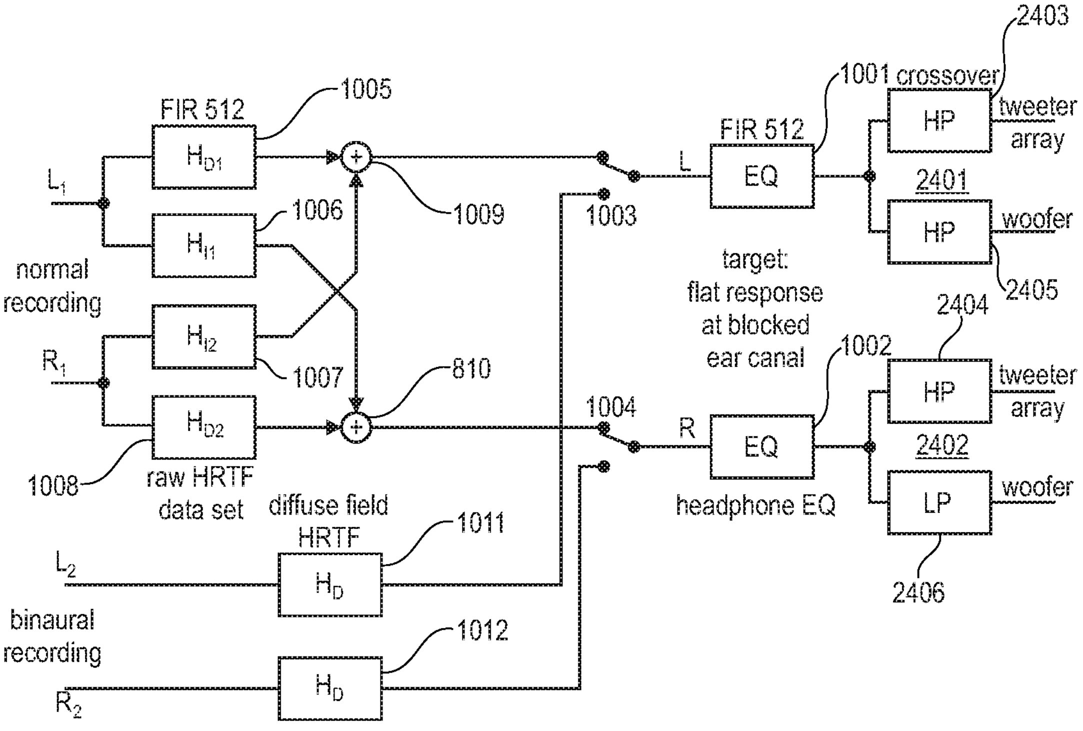

FIG. 23 is an amplitude vs. frequency diagram illustrating frequency responses for equalization filters for the combined system and the frequency responses (left/right) for ear canal entrance reference point flat responses after equalization at the blocked ear canal in accordance with the teachings of the present disclosure; and FIG. 24 is a signal flow diagram illustrating an example signal processing structure for the two-way headphone shown in FIGS. 20 and 21 in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
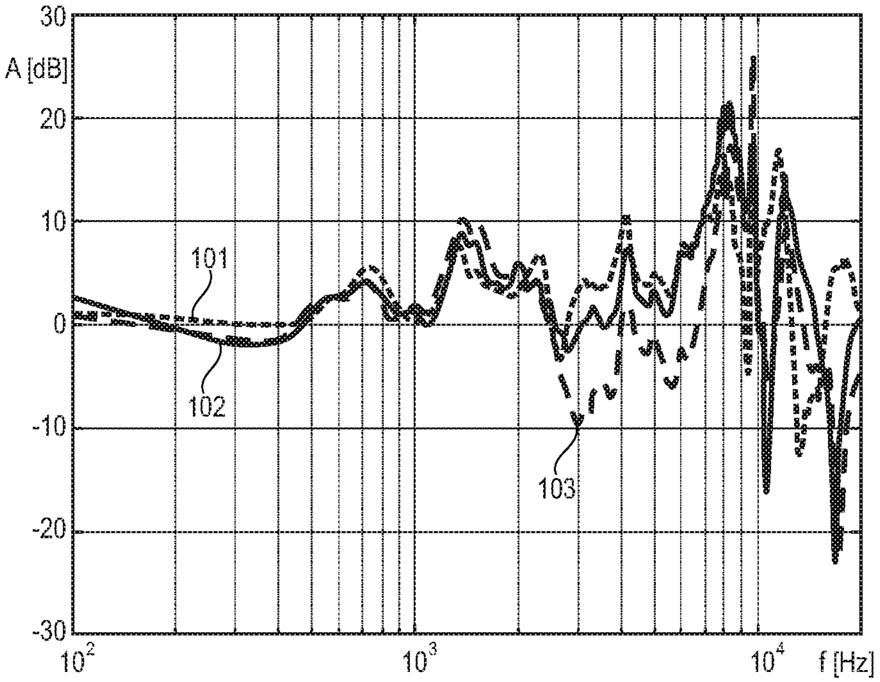
FIG. 1 is an amplitude vs. frequency diagram illustrating ipsilateral, incremental head-related transfer functions in accordance with the teachings of the present disclosure.

A "location dependent frequency response compensation" (LFRC) effect impacts human brains almost instantaneously and with a high degree of accuracy. FIG. 1 is an amplitude A [dB] vs. frequency f [Hz] diagram illustrating ipsilateral, incremental head-related transfer functions (HRTFs) 101, 102 and 103 of a far field sound source at directions of incidence 45°, 90° and 135°, respectively, measured at a blocked ear canal entrance, and normalized to the frontal HRTF at 0° (horizontal midline axis of the face). As shown in FIG. 1, deviations from a flat frequency response increase as the farther away the source moves from the front to the side. However, the sound color of a source that moves in front of a listener (e.g., a walking and speaking person) may not substantially change. In human brains, these rough and fissured location-dependent response curves, as shown in FIG. 1, are automatically detected and instantaneously compensated or equalized.

Figure 2:
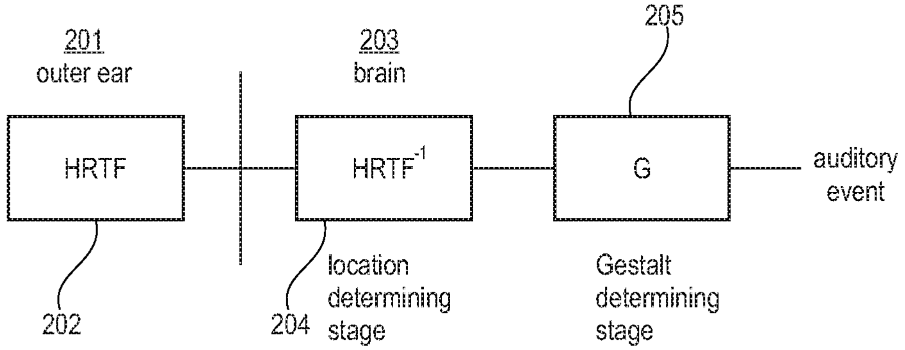
Fig. 2 Prior Art
FIG. 2 is a prior art signal flow chart illustrating an association model.

A first model that explains LFRC was introduced by Gunther Theile in 1980, the "Association Model" and is illustrated by way of a signal flow chart in FIG. 2. Theile used this model to explain effects of stereo phantom imaging and to derive a compensation curve for headphones, as he set forth in "Equalization of studio monitor headphones" (G. Theile, AES conference on headphone technology, Aalborg, August 2016). The model depicted in FIG. 2 describes the outer ear 201 as a filter stage 202 having the transfer function HRTF and the human brain 203 as two stages; a location determining stage 204, where an inversion of the HRTF of the outer ear 201 occurs; and a subsequent "Gestalt" determining stage 205, where the source and its spectral signature are identified and assigned to an auditory event.

Figure 3:
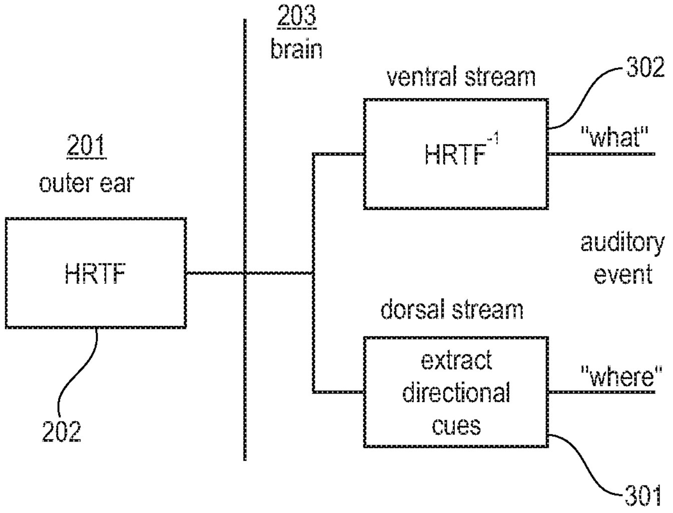
Fig. 3 Prior Art
FIG. 3 is a prior art signal flow chart illustrating a dual-pathway model.

In Brain Research, a slightly different but functionally similar model has been established, the "dual-pathway model" as set forth in S. Arnott et al, "Assessing the auditory dual-pathway model in humans" (Neurolmage 22, 2004, pages 401-408), and is depicted by way of a signal flow chart in FIG. 3. Experiments employing functional magnetic resonance imaging (fMRI) show that directional information extraction 301 (the "where"), and source identification 302 (the "what") are segregated into different (parallel) streams in the brain 203, a dorsal stream and a ventral stream, which can be observed in distinct areas of the brain.

LFRC employs an intact, undisrupted acoustic path to the ear canal from a sufficiently distant sound source. This is not provided by headphones that either cover the pinna (e.g., with circumaural headphones), or even bypass the path HRTF completely by extending into the ear canal (e.g., as in the case of in-ear headphones or hearing aids). However, the human brain further attempts to infer directional information and to identify the source and tone color of the sound, where the source is a headphone. LFRC routines may still be employed, but with reduced predictability and accuracy, which may depend on where the headphone transducer is located with respect to the pinna, the shape and temporal dispersion of the sound field caused by, for example, reflections in the headphone ear cup or ear cushion around the pinna.

Head-related transfer functions may be measured at the ear canal entrance reference point (EEP) with a microphone that blocks the ear canal. A transfer function is employed for headphone equalization (EQ), and the transfer function is the average of the overall HRTFs around the head, (i.e., the diffuse field HRTF). In a first step, the headphone response is equalized to a flat response at the EEP, and then a diffuse field HRTF is applied as target function. However, such measurements result in a reasonably neutral sound because the brain is unable to extract meaningful direction information from the incoming sound and therefore assumes a diffuse field.

Figure 4:
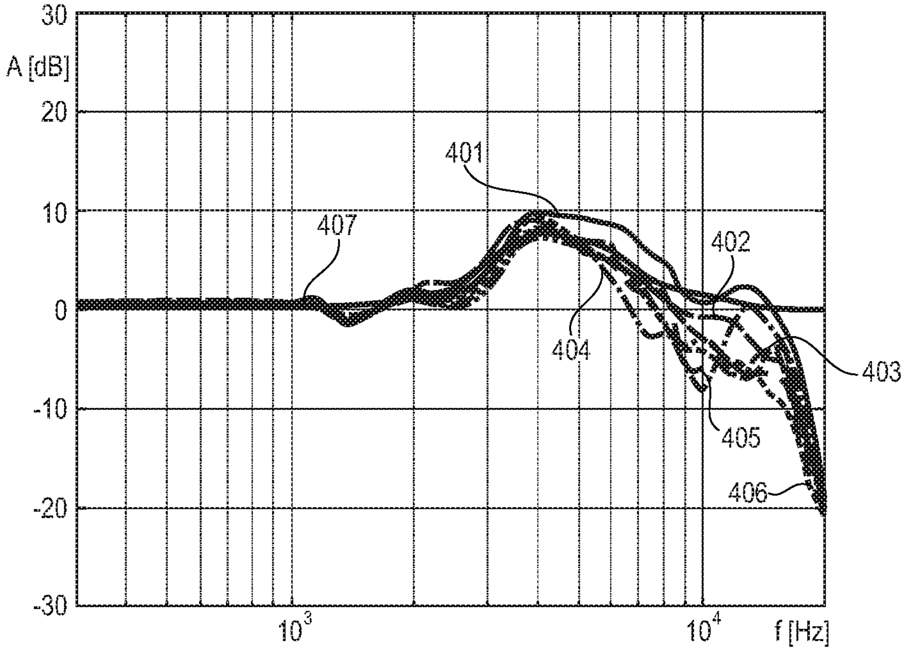
FIG. 4 is an amplitude vs. frequency diagram illustrating diffuse field head-related transfer functions of six test subjects compared to a two-biquad model in accordance with the teachings of the present disclosure.

FIG. 4 illustrates diffuse field HRTFs 401-406 of six subjects. A transfer function 407 of a low-order approximation comprised of two EQ biquad filters is additionally shown. The transfer functions peak around 4 KHz at about 8 dB, but they show a considerable variation among different individuals above that frequency.

Figure 5:
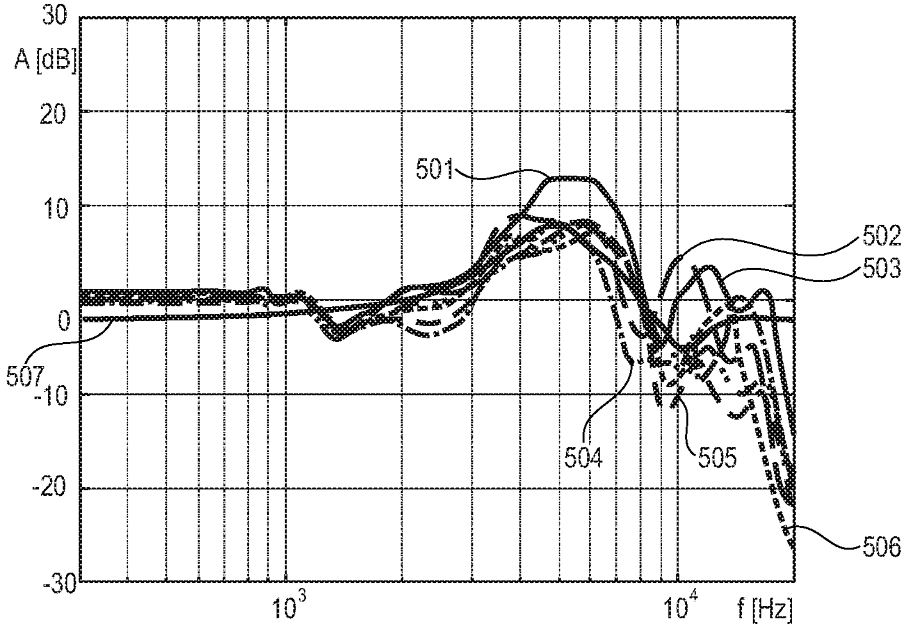
FIG. 5 is an amplitude vs. frequency diagram illustrating side-incidence head-related transfer functions of six test subjects compared to a two-biquad model in accordance with the teachings of the present disclosure.

Alternatively, a side-incidence HRTF (e.g., a 90° deviation from the horizontal midline axis of the face) may be used as a target function, based on the assumption that headphone transducers may be oriented in this manner. Example side HRTFs 501-506 of six different test subjects exhibit similar shapes but are centered around 5 KHz with even larger individual variations above 5 KHz, as shown in FIG. 5. A transfer function 507 of a low-order approximation based on two EQ biquad filters is also depicted in FIG. 5 for comparison. Thus, it may be advantageous to adjust the target function to each individual.

Figure 6:
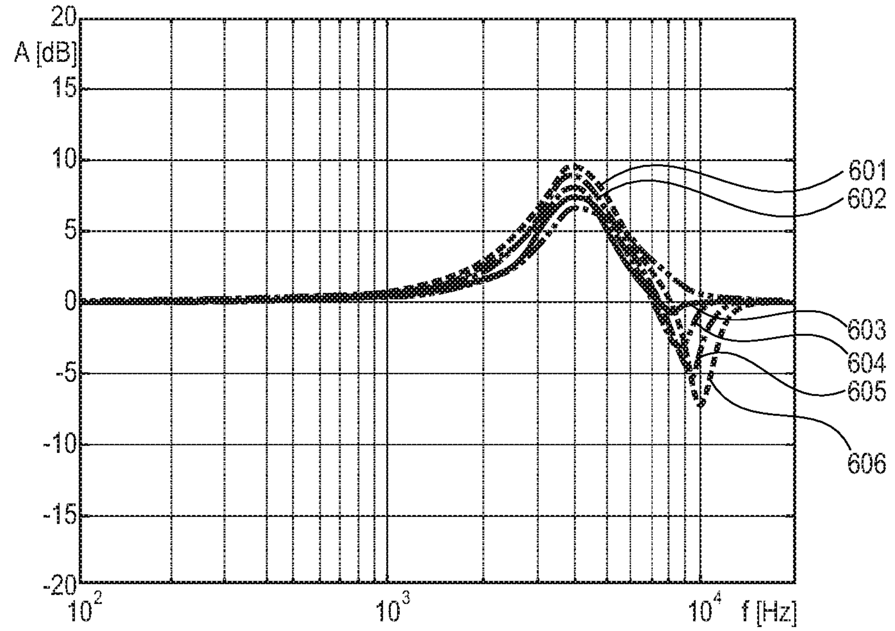
FIG. 6 is an amplitude vs. frequency diagram illustrating a set of frequency characteristics (also referred to as frequency responses) of six test subjects that depict adjustable ear canal entrance reference point target functions (parametric model) in accordance with the teachings of the present disclosure.

FIG. 6 shows a set of frequency characteristics 601-606 (of six test subjects) that depict adjustable EEP target functions (parametric model) for headphone equalization employing a peak filter and a notch filter. The headphone equalization may be integrated into a smartphone app, in which, for example, 2-3 parameters can be adjusted for optimum sound.

Figure 7:
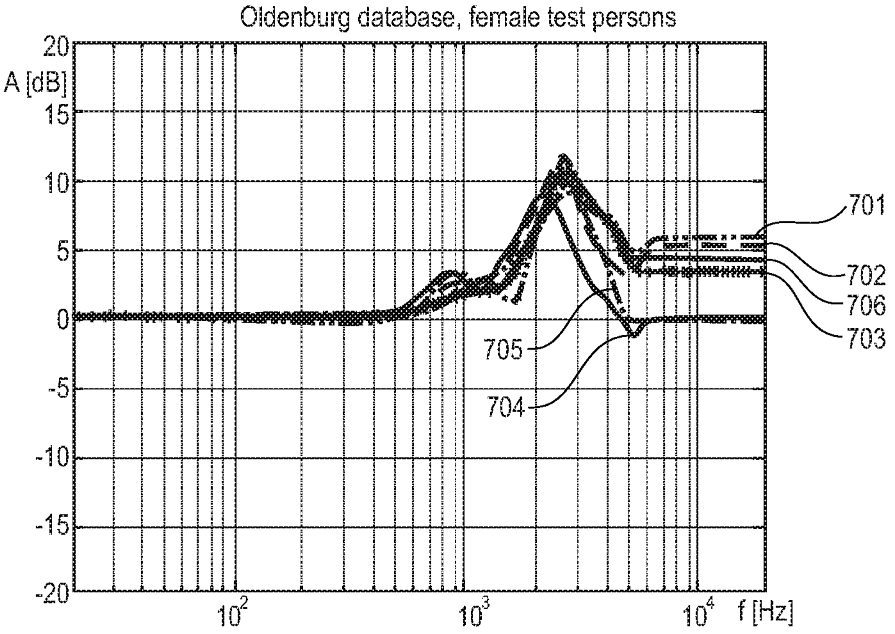
FIG. 7 is an amplitude vs. frequency diagram illustrating frequency characteristics of measured ear canal transfer functions for six female test subjects in accordance with the teachings of the present disclosure.
Figure 8:
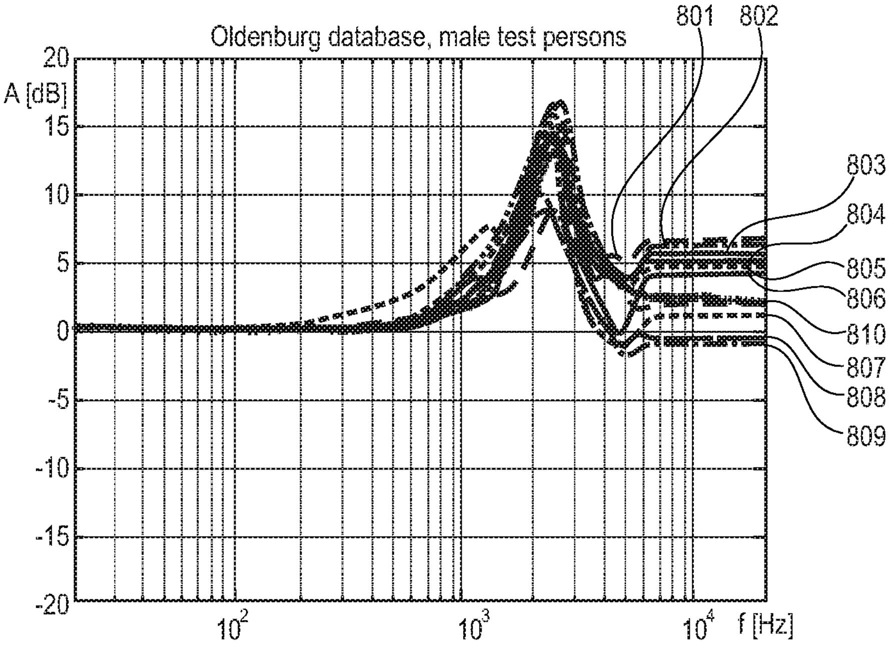
FIG. 8 is an amplitude vs. frequency diagram illustrating frequency characteristics of measured ear canal transfer functions for six male test subjects in accordance with the teachings of the present disclosure.

The ear drum reference point (DRP) may be employed for headphone equalization because suitable and standardized artificial ears (couplers) exist. FIGS. 7 and 8 illustrate frequency characteristics of measured ear canal transfer functions (TCRF) 701-705 for five female test subjects versus the frequency characteristics 706 of a modeled female transfer function and measured ear canal transfer functions (TCRF) 801-809 for nine male test subjects versus the frequency characteristics 810 of a modeled male transfer function. The transfer functions were computed as complex quotients between transfer functions measured at the entrance of the blocked ear canal, and at the ear drum, with a diffuse direction of incidence as set forth in Florian Denk et al, "Adapting hearing devices to the individual ear acoustics: Database and target response correction functions for various device styles", (Trends in Hearing Vol. 22:1-19, 2018, and downloaded from this database as "Target Response Correction Functions TRCF"). Both transfer function sets show strong variations of peak gains and high frequency shelving gains. On the average, male subjects have higher gain. Center frequencies are rather stable at 2.5-2.8 KHz. A parametric version for individual adjustment is beneficial, or at least a male/female switch. Combining the TRCF (ear canal resonance) with the EEP target function yields a target function for headphone equalization at the drum reference point (DRP).

Figure 9:
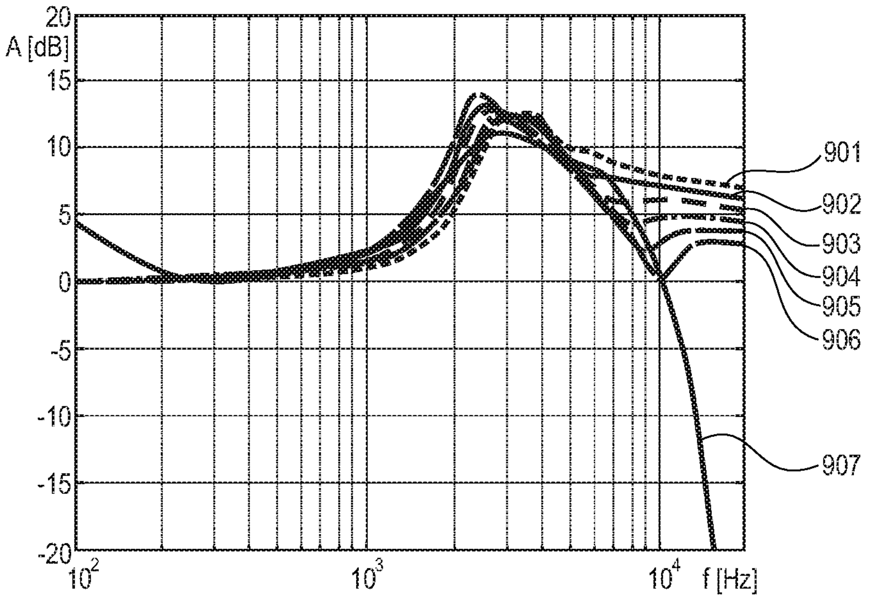
FIG. 9 is an amplitude vs. frequency diagram illustrating frequency characteristics of example transfer functions (parametric versions) at an ear drum reference point compared to frequency characteristics of an example fixed target function in accordance with the teachings of the present disclosure.

FIG. 9 illustrates frequency characteristics of example DRP transfer functions 901-906 (parametric versions) compared to frequency characteristics of an example fixed target function 907. It may be advantageous to equalize the headphone frequency characteristics with respect to the EEP target, not the DRP target, in connection with using the natural ear canal resonance, so that the number of unknown parameters can be reduced.

Figure 10:
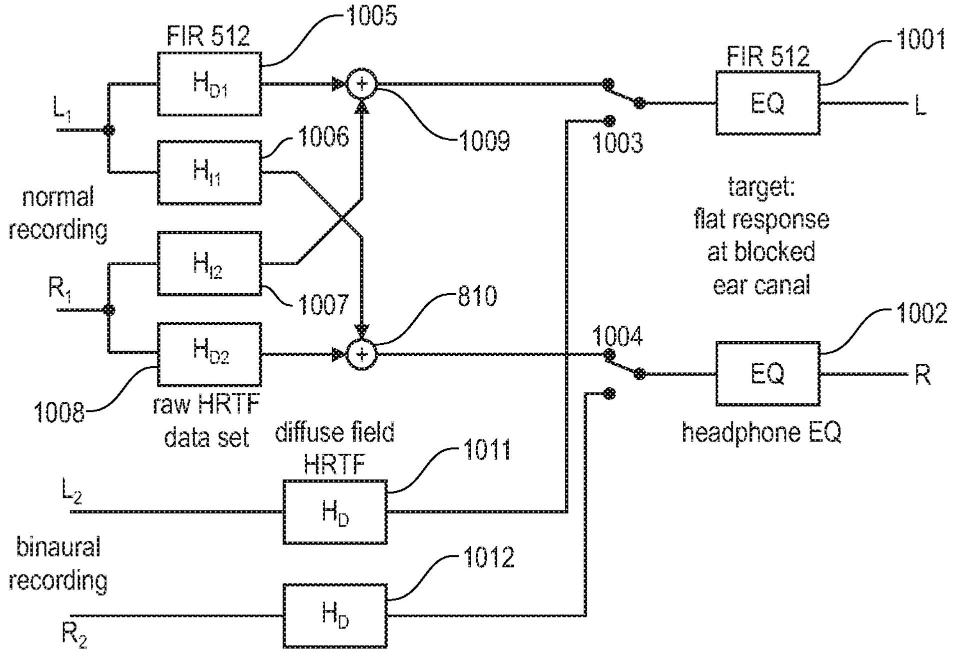
FIG. 10 is a signal flow diagram illustrating a signal processing structure for an around-the-ear headphone in accordance with the teachings of the present disclosure.

FIG. 10 is a signal flow diagram illustrating a signal processing structure for an around-the-ear headphone. At the output side, left L and right R, channels are equalized by way of a pair of finite impulse response (FIR) filters 1001 and 1002 that may have 128-512 taps and that are configured to invert the response between electrical input and probe microphones located at the blocked ear canal entrance (EEP reference point).

Figure 11:
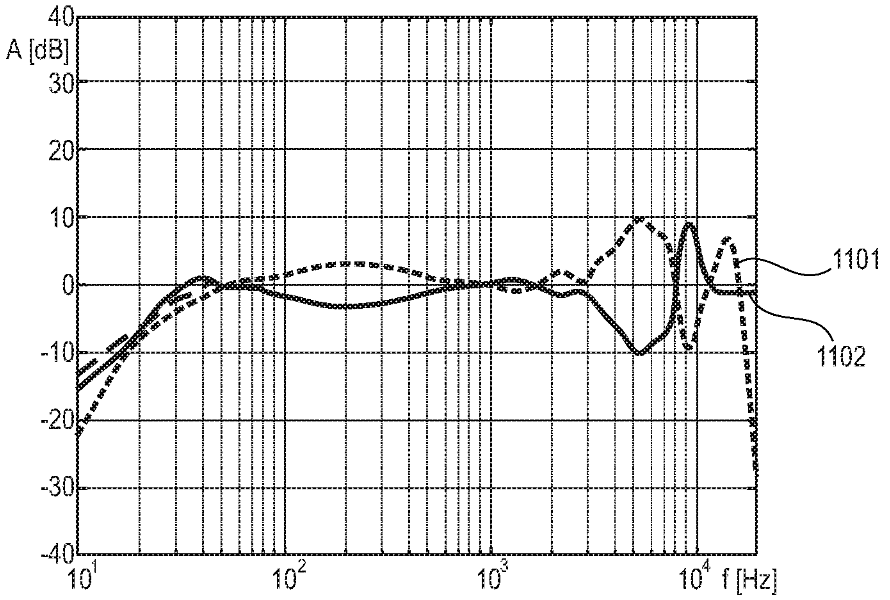
FIG. 11 is an amplitude vs. frequency diagram illustrating example blocked ear canal responses and equalization filter frequency responses using a Beyerdynamic DT880 headphone in accordance with the teachings of the present disclosure.
Figure 12:
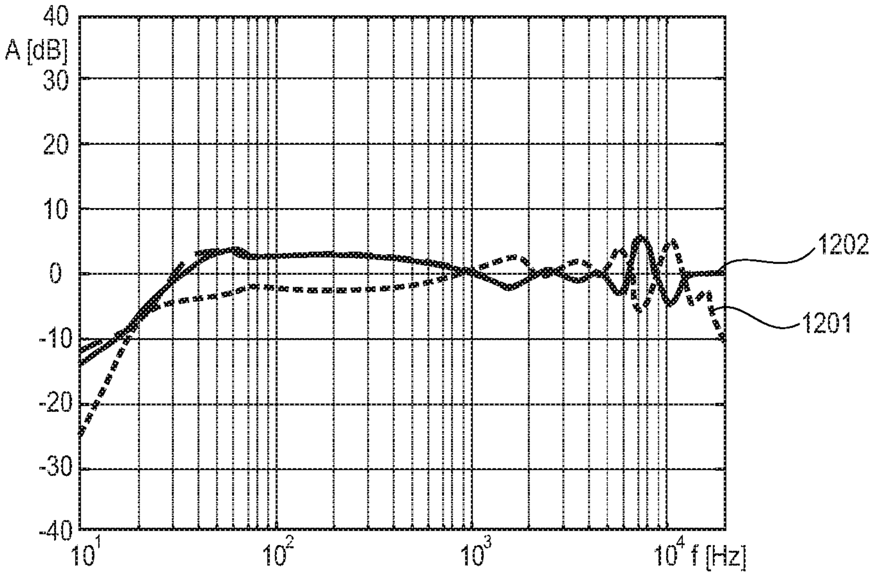
FIG. 12 is an amplitude vs. frequency diagram illustrating example blocked ear canal responses and equalization filter frequency responses using a Stax SR-307 headphone in accordance with the teachings of the present disclosure.

Referring to FIGS. 11 and 12, examples of blocked ear canal responses 1101, 1201 and EQ filter frequency responses for specific headphones 1102, 1202 are shown. FIG. 11 is associated with a Beyerdynamic DT880 headphone, and FIG. 12 is associated with a Stax SR-307 headphone. The EQ filters include a high pass target and an upper frequency limit (e.g., 12 KHz), above which no equalization is applied. The original responses are smoothed prior to equalization to avoid sharp peaks and to reduce sensitivity to positioning variations of the headphone on the head. It can be readily seen that the Stax SR-307 headphone employs less equalization.

Referring again to FIG. 10, the signal processing structure shown further includes switches 1003, 1004 for each channel (L, R) for selecting between two listening modes. In a first listening mode, a first input path of the switches 1003, 1004 features a set of filters 1005-1008 (e.g., FIR filters with 512 taps) having raw (i.e., not diffuse field equalized) head related transfer functions HD1, HI1, HI2 and HD2, where two of the filters are ipsilateral (HD1 and HD2), and two are contralateral (HI1 and HI2). The filters 1005 and 1006 receive a first signal L1 from a normal recording source (not shown), and the filters 1007 and 1008 receive a second signal R1 from the normal recording source. Outputs of filters 1005 and 1007 are summed up by an adder 1009 to supply a first sum signal to switch 1003 and outputs of filters 1006 and 1008 are summed up by an adder 1010 to supply a second sum signal to switch 1004.

Figure 13:
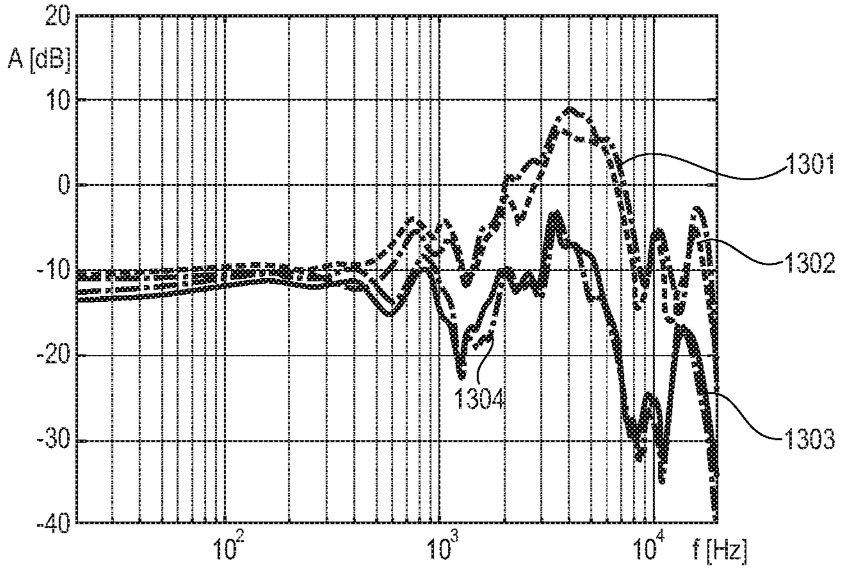
FIG. 13 is an amplitude vs. frequency diagram illustrating a set of four example raw head related transfer functions at +45° taken from a database in accordance with the teachings of the present disclosure.
Figure 14:
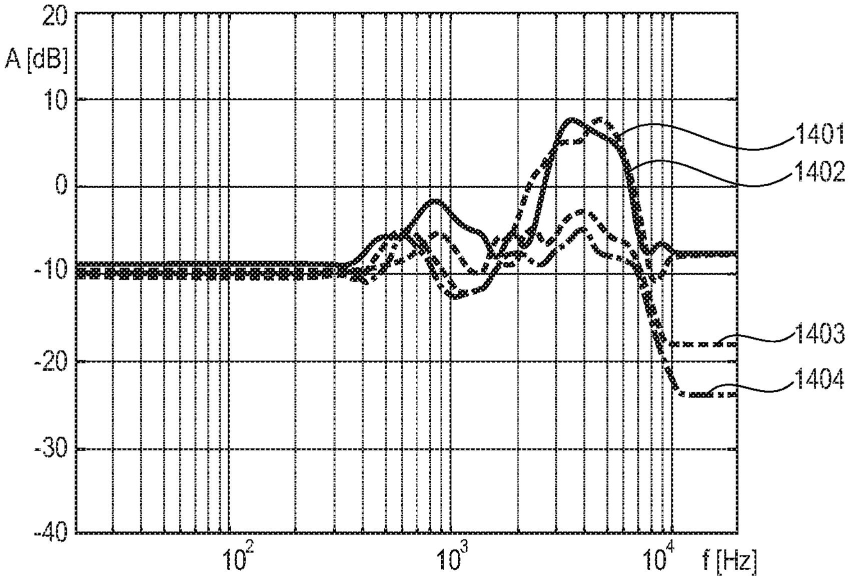
FIG. 14 is an amplitude vs. frequency diagram illustrating a set of four example raw head related transfer functions measured at +45° with personal in-ear microphones in accordance with the teachings of the present disclosure.

Referring to FIGS. 13 and 14, two sets of four raw head related transfer functions 1301-1304 and 1401-1404, respectively, are depicted. The chosen direction in FIGS. 13 and 14 is ±45° to thereby create a pair of virtual sound sources in front of the head. The first listening mode applies to normal source material that has been mixed in a studio for a standard stereo loudspeaker setup. While there is no obvious gross spectral difference between the curves, they sound very different. The brain appears to process information based on a different acoustic pattern. A simple parametric model does not deliver a comparable result by far. It is noted that the HRTF curves shown in FIG. 14 have been post-processed. They are band-limited, minimum phased, and the interaural time delay path has been realized separately.

In a second listening mode of the signal processing structure shown in FIG. 10, filters 1011 and 1012, having transfer functions HD that model diffuse field HRTFs, are employed in the other input paths of switches 1003 and 1004, respectively. The filters 1011 and 1012 are supplied with signals L2 and R2 from a binaural recording source (not shown). The transfer functions HD are designed in accordance with the curves shown in FIGS. 4 and 6. The second listening mode is provided for source material that has been produced with binaural microphones, such as with a dummy head. Since such recordings are usually diffuse field equalized, an external target filter is required to reverse the diffuse field equalization. This mode also represents "normal" headphone listening, with the image being located in the head when the source material is not a dummy head recording.

Figure 15:
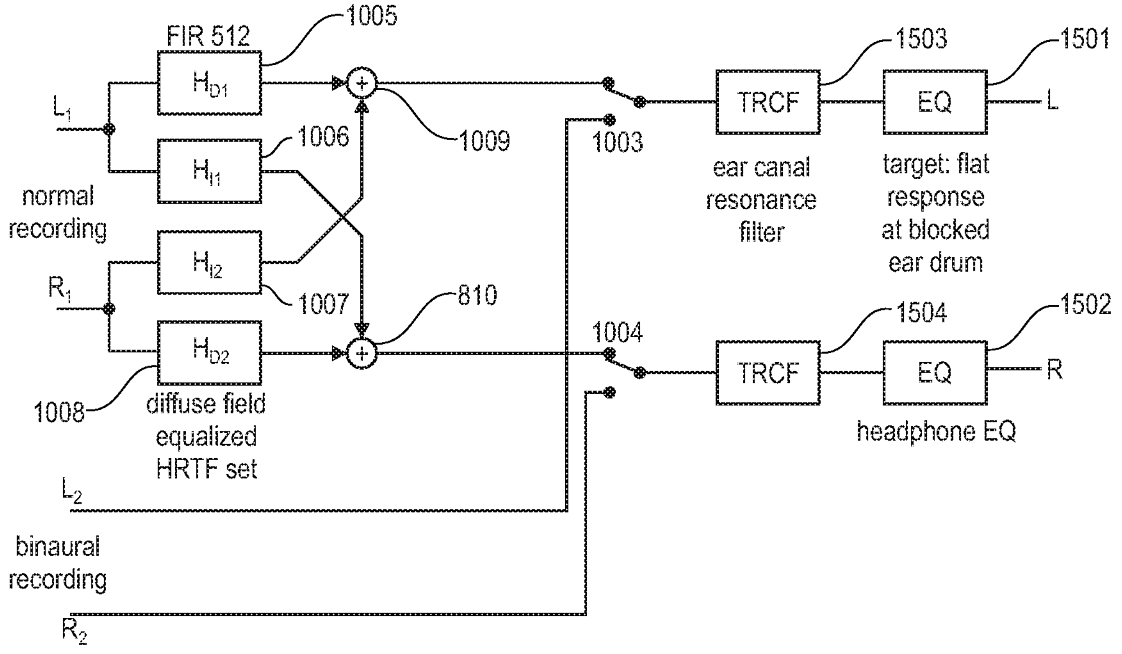
FIG. 15 is a signal flow diagram illustrating a signal processing structure for an in-ear headphone in accordance with the teachings of the present disclosure.

In-ear headphones require a different signal processing structure, as can be seen from the signal flow diagram shown in FIG. 15. At the output, signals are equalized by way of an equalizer filter 1501, 1502 per channel to a flat response at the ear drum using an ear simulator or according to a specific method. This method includes: generating a sound signal and reproducing the sound signal by way of a transducer in an in-ear headphone when the in-ear headphone is placed within a user's ear canal, receiving a reflected sound signal with a first microphone, generating a frequency response based on the reflected sound signal, and generating the user's ear drum response based on the frequency response. The method further includes generating a second sound signal, modifying the second sound signal based on the user's ear drum response, and playing the modified second sound signal at the transducer.

In the signal processing structure shown in FIG. 15, two TCRF filters 1503 and 1504 (i.e., one per channel) are connected upstream of the equalizer filters 1501, 1502 and represent the target, emulating the ear canal resonance, as explained above in connection with FIGS. 7 and 8. The remaining structure upstream of the TCRF filters 1503 and 1504 is identical with the respective parts (i.e., elements 1003-1010) of the structure shown in FIG. 10 except for the filters 1011 and 1012, which have been substituted with direct lines.

Listening tests indicate that diffuse field HRTF target filters, which would be required with around-the-ear headphones, introduce unwanted colorations and may therefore be omitted in the case of in-ear headphones. The brain appears to recognize that all head-related features are missing and thus there is no need for compensation. This can be seen as proof for the existence of the LFRC effect explained above. A binaural recording source can be applied directly (bottom path in FIG. 15), and the HRTF set to simulate a speaker pair is diffuse field equalized to sound neutral.

Figure 16:
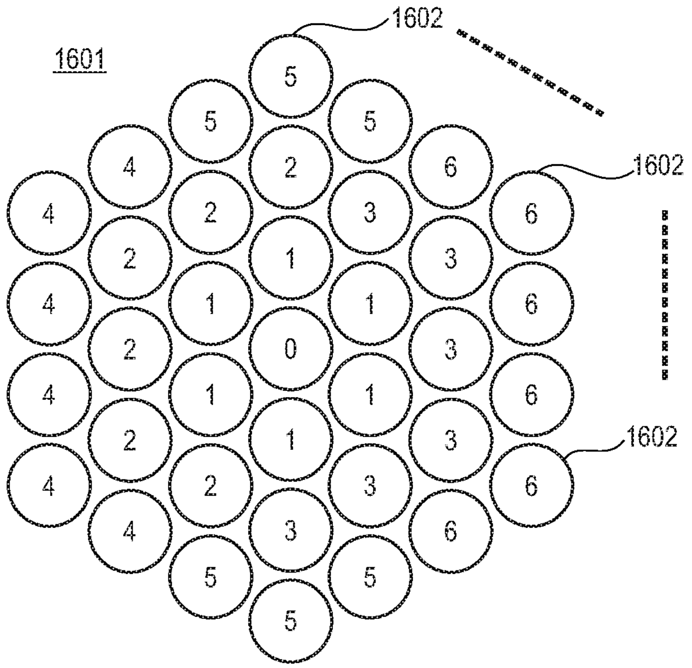
FIG. 16 is a schematic diagram illustrating an array of 37 small transducers used in a prototype headphone in accordance with the teachings of the present disclosure.
Figure 17:
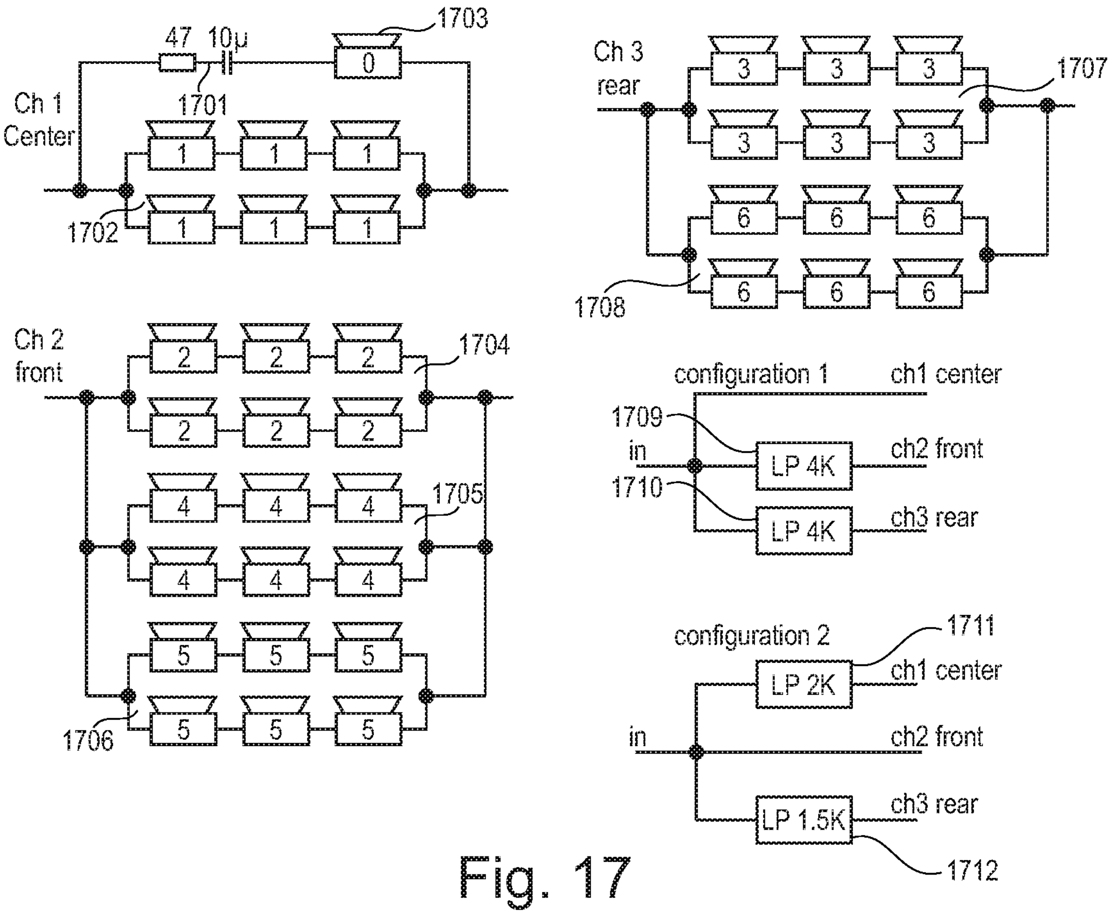
FIG. 17 is a signal flow diagram illustrating an example electrical connection of the array shown in FIG. 16 in accordance with the teachings of the present disclosure.

To investigate effects of transducer size and transducer location, and further study the LFRC effect, a transducer arrangement of a prototype headphone was set up with an array 1601 of 37 transducers 1602 (e.g., 12 mm loudspeakers) that may be connected to separate amplifiers and digital signal processor (DSP) channels, as can be seen from FIG. 16. The transducers 1602 may be electrically combined to (e.g., 7) subsets represented by numbers 0-6, as schematically shown in FIG. 17 in combination with FIG. 16. There is a central transducer array including subsets 0, 1, and 5, a front array, including subsets 2 and 4, and a rear array including subsets 3 and 6.

Figure 18:
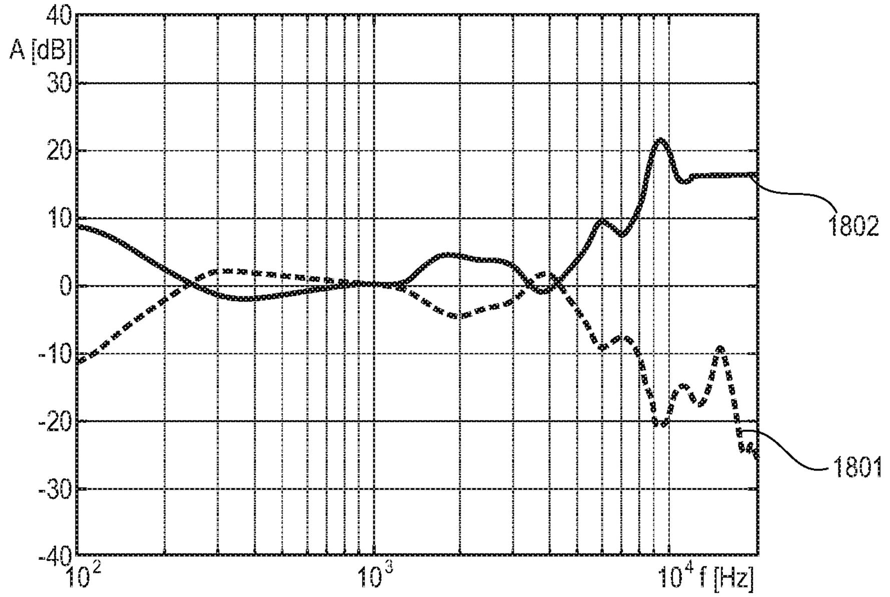
FIG. 18 is an amplitude vs. frequency diagram illustrating the center frequency characteristic and the frequency characteristic of the corresponding equalization filter in a first configuration of a driver circuit for the array shown in FIG. 16 in accordance with the teachings of the present disclosure.
Figure 19:
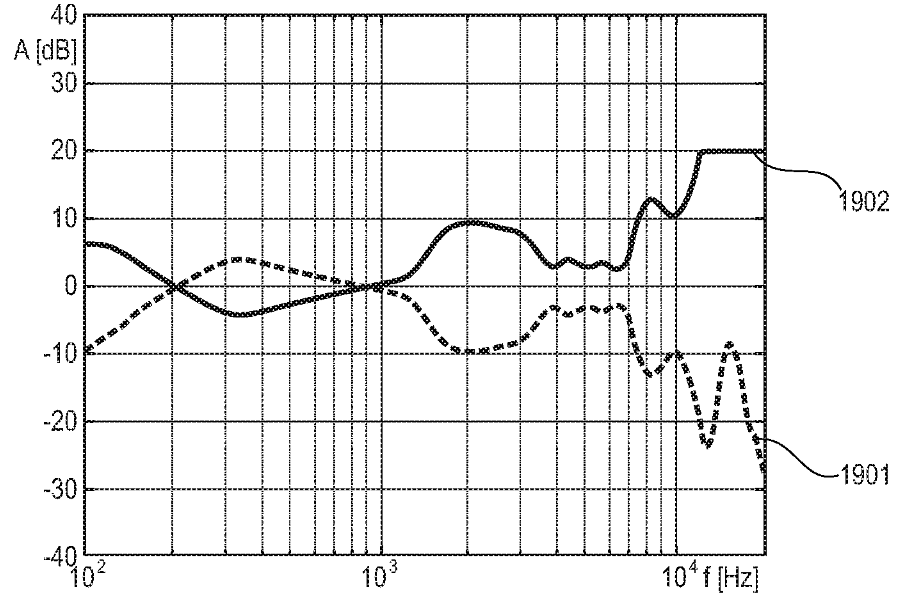
FIG. 19 is an amplitude vs. frequency diagram illustrating the front frequency characteristic and the frequency characteristic of the corresponding equalization filter in a second configuration of a driver circuit for the array shown in FIG. 16 in accordance with the teachings of the present disclosure.

In a further experiment, the subsets 0-6 were assigned to three arrangements, center channel ch1 center, a front channel ch2 front, and a rear channel ch3 rear (connected to three DSP channels), as shown in FIG. 17. Each arrangement includes a number of groups 1702-1708 of parallel connected paths, each path having three series-connected transducers of one mutual subset 1-6, except for the transducer 1702 of subset 0, which is connected in series with a resistor capacitor (RC) element 1701. Two configurations were created in the DSP, with a configuration 1 focusing on the center portion, while the other arrangements were low-pass filtered with low-pass filters 1709 and 1710, both having a corner frequency of 4 KHz. Similarly, a configuration 2 focuses on the frontal area of the pinna, while the other arrangements were low-pass filtered with low-pass filters 1711 (center, critical frequency of 2 KHz) and 1712 (rear, critical frequency of 1.5 KHz). Both configurations were then equalized to flat responses at the EEP point. Corresponding frequency characteristics are illustrated in FIGS. 18 and 19. FIG. 18 shows the center frequency characteristic (response) 1801 and the frequency characteristic 1802 of the corresponding EQ filter of the first configuration. FIG. 19 shows the front frequency characteristic (response) 1901 and the frequency characteristic 1902 of the corresponding EQ filter of the second configuration.

During listening tests, strong timbre differences became apparent between the two configurations. Despite both being equalized to the same flat response, and with the proper target function as explained previously, the frontal transducer configuration (second configuration) sounded more natural and brighter, while the center configuration (first configuration) sounded comparably muffled and with less apparent separation between instruments. The stereo image was wider and more in front for the frontal configuration. This result can be explained by the LFRC effect. The frontal transducer preserves natural pinna cues better and is better suited to generate the desired frontal, out-of-head image. This leads to the conclusion that transducer location matters in headphone design. Locations in front of the pinna are preferable to locations at the side. The array headphones could be used in applications, such as multichannel, surround-sound headphones, where rear transducer sections may represent surround channels, to actively control reflections in the earcup, thereby emulating an "open" headphone, and as gaming headphones featuring 360° imaging.

FIG. 20 illustrates parts of an example two-way earphone 2001 with a large, low-frequency transducer (e.g., e.g., a low-frequency loudspeaker such as a woofer) 2002 and an array of at least three (e.g., six) small, high-frequency transducers 2003 (e.g., high-frequency loudspeakers such as tweeters) disposed in front of the ear from a frontal perspective (also referred to as rostrally disposed). A crossover filter, such as a 3rd order high pass and lowpass Butterworth filter pair in Y configuration, separates the two at around 1 KHz. The low-frequency transducer 2002 may be 40-50 mm in diameter, and the high frequency transducers 2003 may be 8-12 mm. For example, six (e.g., identical) tweeters are employed as high-frequency transducers 2003 in the set-up shown in FIG. 20. The high-frequency transducers 2003 may be electrically connected in parallel (or in series or a combination of both). The low frequency transducer 2002 and the high frequency transducers 2003 may be mounted in a mutual plane, e.g., on a planar carrier plate 2004, and may have main broadcasting directions that are aligned with each other and perpendicular to the carrier plate.

It is assumed that the low-frequency transducer 2002 has a center Z that is congruent with the intersection point of two perpendicular axes, a horizontal (rear-front) axis X and a vertical (bottom-top) axis Y. All high-frequency transducers 2003 are disposed adjacent to the low-frequency transducer 2002, e.g., on a curved line such as an arc that may be defined by an imaginary circle line F coaxial with the center Z. The axes X and Y divide the area within a further imaginary circle line E, which is coaxial with the circle line F and has a greater diameter than circle line F, in four quadrants: a lower rostral (i.e., bottom, front) quadrant A, an upper rostral (i.e., top, front) quadrant B, an upper caudal (i.e., top, front) quadrant C and a lower caudal (i.e., bottom, rear) quadrant D. Three of the high-frequency transducers 2003 are positioned in the lower, rostral quadrant A. Two of the high-frequency transducers 2003 are positioned in the upper rostral quadrant B. One of the high-frequency transducers 2003 is positioned on the axis Y between quarters A and B, i.e., is partly contained in quadrant A and partly in quadrant B. The high-frequency transducers 2003 are, for example, spaced at equal distance from one another, and the low-frequency transducer 2002 and the at least three high-frequency transducers 2003 of each earphone have, for example, main broadcasting directions that are aligned with each other. The arrangement shown in FIG. 20 has been found to fulfill the requirements outlined above.

FIG. 21 is a cross-sectional top view of the earphone 2001 of FIG. 20, which may form part of a headphone 2101. The earphone 2001 includes a housing 2104 with the plate 2004 integrated to carry the low-frequency transducer 2002 and the high-frequency transducers 2003. The earphone 2001 further includes two chambers, woofer chamber 2105 and tweeter chamber 2106, that encompass the low-frequency transducer 2002 and the high-frequency transducers 2003, respectively. The earphone 2001 has a partially open design, with large rear vent holes 2107, 2108 at the back of the separate woofer and tweeter chambers 2105, 2106, and a perforated (breathing) ear cushion 2109. This design reduces unwanted reflections in the housing 2105 (e.g., an ear cup), as opposed to a completely sealed design. Below the crossover point of 1 KHz, the enclosed space acts as a pressure chamber, where the position of the transducer has no effect and cannot be detected.

Figure 22:
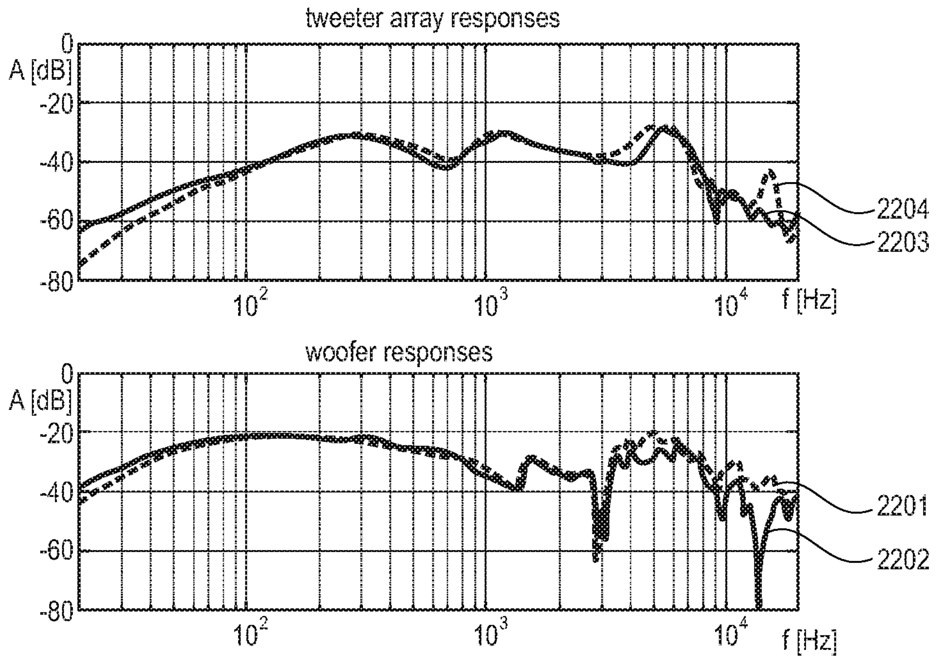
FIG. 22 is an amplitude vs. frequency diagram illustrating ear canal entrance reference point frequency responses of the woofer and an ear canal entrance reference point frequency response of the tweeter array before re-combination by the crossover filter in accordance with the teachings of the present disclosure.

FIG. 22 shows EEP frequency responses (left, right) 2201, 2202 of the woofers and EEP frequency responses (left, right) 2203, 2204 of the tweeter arrays, before re-combination by the crossover filter. The tweeter frequency responses are notably smoother and exhibit no notches in their frequency band. FIG. 23 depicts the frequency responses (left/right) 2303, 2304 for EQ filters for the combined system and the frequency responses (left/right) 2301, 2302 for the EEP flat responses after equalization at the blocked ear canal.

FIG. 24 is flow chart, which corresponds to the signal processing structure shown in and described in connection with FIG. 10, with additional crossover filters 2501 and 2502 at the output. Each crossover filter includes a high pass filter 2403, 2404 and a lowpass filter 2405, 2406 connected in a Y configuration. With this design, a clear improvement of sound quality over conventional headphones, in terms of timbre, transparency, separation of sound objects and frontal imaging that extends well beyond the head, could be achieved.

The headphones described above include a higher number of transducers (e.g., ≥3, ≥5, and more) arranged as an array, in connection with dedicated signal processing to improve tonal and spatial accuracy, while taking the LFRC effect into account. The transducers may be of any type that converts an electrical signal into sound.

The digital signal processing may be implemented by hardware, software, firmware or any combination thereof. The software and/or firmware may be stored on or in a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The digital signal processing may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While various embodiments of the disclosure have been described, it will be apparent to those of ordinary skilled in the art that many more embodiments and implementations are possible within the scope of the disclosure. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A headphone arrangement comprising:

two earphones, wherein each earphone from among the two earphones comprises a housing that encompasses a low-frequency transducer and an array of at least three high-frequency transducers, wherein:

the low-frequency transducer of each earphone is disposed on or over an ear canal of a user when the earphone is worn by the user, and wherein the low-frequency transducer of each earphone is configured to broadcast low-frequency sound that corresponds to low-frequency components of an input signal; and the array of at least three high frequency transducers of each earphone is configured to broadcast high-frequency sound that corresponds to high-frequency components of the input signal, and the array of at least three high frequency transducers of each earphone is disposed adjacent to the low-frequency transducer and in a lower rostral quadrant of a full circle around the low-frequency transducer when the earphone is worn by the user.

2. The headphone arrangement of claim 1, wherein each array further comprises at least one additional high-frequency transducer that is disposed at least partly in an upper rostral quadrant of the full circle around the low-frequency transducer when the earphone is worn by the user.

3. The headphone arrangement of claim 1, wherein the array of at least three high-frequency transducers is spaced at equal distances from one another.

4. The headphone arrangement of claim 1, wherein the array of at least three high frequency transducers is disposed along a curved line.

5. The headphone arrangement of claim 1 further comprising two corresponding crossover filters connected upstream of the low-frequency transducer and the array of at least three high-frequency transducers, each crossover filter being configured to separate high-frequency signals and low-frequency signals of the input signal.

6. The headphone arrangement of claim 5, wherein the two crossover filters have a corner frequency between a frequency of the high-frequency signals and a frequency of the low-frequency signals, the corner frequency between 500 Hz and 2000 Hz.

7. The headphone arrangement of claim 1 further comprising two equalization filters connected upstream of the low-frequency transducer and the array of high-frequency transducers, the two equalization filters configured to flatten a frequency response measured at an ear canal entrance of the user when the earphone is worn by the user.

8. The headphone arrangement of claim 1, wherein the low frequency transducer of each earphone and the array of at least three high frequency transducers are mounted in a mutual plane.

9. The headphone arrangement of claim 8, wherein the low frequency transducer of each earphone and the array of at least three high frequency transducers have main broadcasting directions that are parallel to each other.

10. The headphone arrangement of claim 1, wherein the housing comprises at least one vent.

11. The headphone arrangement of claim 1, wherein the housing of each earphone comprises two chambers, wherein a first chamber from among the two chambers encompasses the low-frequency transducer, and the second chamber from among the two chamber encompasses the array of at least three high-frequency transducers of the corresponding earphone.

12. The headphone arrangement of claim 1, wherein the low-frequency transducer has a diameter between 40 mm and 50 mm.

13. The headphone arrangement of claim 1, wherein each of the high-frequency transducers of the array of at least three high-frequency transducers has a diameter between 8 mm and 12 mm.

14. The headphone arrangement of claim 1, wherein the array of at least three high-frequency transducers are identical.

15. The headphone arrangement of claim 1 further comprising, for each earphone, a diffuse field HRTF filter, a raw HRTF filter set, and a mode switch, the mode switch configured to activate, in a first mode, the diffuse field HRTF filter and, in a second mode, the mode switch configured to activate the raw HRTF filter set.

* * * * *